(12) United States Patent
Kienzle et al.

(10) Patent No.: US 7,634,811 B1
(45) Date of Patent: Dec. 15, 2009

(54) VALIDATION OF SECURE SOCKETS LAYER COMMUNICATIONS

(75) Inventors: Darrell Kienzle, Vienna, VA (US); Matthew Elder, Germantown, MD (US)

(73) Assignee: Symantec Corporation, Mountain View, CA (US)

( * ) Notice: Subject to any disclaimer, the term of this patent is extended or adjusted under 35 U.S.C. 154(b) by 876 days.

(21) Appl. No.: 11/134,696

(22) Filed: May 20, 2005

(51) Int. Cl.
*G08B 23/00* (2006.01)
(52) U.S. Cl. ........................................................ 726/22
(58) Field of Classification Search ........................ None
See application file for complete search history.

(56) References Cited

U.S. PATENT DOCUMENTS

| | | | |
|---|---|---|---|
| 6,088,803 A | 7/2000 | Tso et al. | |
| 6,314,409 B2 | 11/2001 | Schneck | |
| 6,928,553 B2 | 8/2005 | Xiong et al. | |
| 2002/0083343 A1 | 6/2002 | Crosbie | |
| 2002/0087882 A1 | 7/2002 | Schneier et al. | |
| 2002/0157020 A1 | 10/2002 | Royer | |
| 2003/0037251 A1 | 2/2003 | Frieder | |
| 2003/0051026 A1 | 3/2003 | Carter | |
| 2004/0187023 A1* | 9/2004 | Alagna et al. | 713/200 |
| 2006/0248575 A1* | 11/2006 | Levow et al. | 726/1 |

FOREIGN PATENT DOCUMENTS

WO    WO 01/71499 A1    9/2001

OTHER PUBLICATIONS

Lee, Sin Yeung; Low, Wai Lup and Wong, Pei Yuen, "Learning Fingerprints for a Database Intrusion Detection System", Computer Security Laboratory, DSO National Labortories, Singapore, ESORICS Nov. 2002, LNCS 2502, pp. 264-279.

Low, Wai Lup, et al., "DIDAFIT: Detecting Intrusions In Databases Through Fingerprinting Transactions," ICEIS 2002, Fourth International Conference On Enterprise Information Systems, vol. 1, Apr. 3-6, 2002, pp. 121-128, Ciudad Real, Spain.

Change log for Analysis Console for Intrusion Detection (Acid), indicating release date of Sep. 8, 2000 [online]. Andrew.cmu.edu [retrieved Apr. 18, 2003]. Retrieved from the Internet: <URL: http://www.andrew.cmu.edu/~rdanyliw/snort/CHANGELOG>, U.S.A.

AirCERT web page, last updated Sep. 18, 2000 [online]. Cert.org [retrieved Apr. 18, 2003]. Retrieved from the Internet: <URL: http://www.cert.org/kb/aircert/>, U.S.A.

Analysis Console For Intrusion Detection (ACID) web page [online]. Andrew.cmu.edu [retrieved Apr. 18, 2003]. Retrieved from the Internet: <URL: http://www.andrew.cmu.edu/~rdanyliw/snort/snortacid.html>, U.S.A.

(Continued)

*Primary Examiner*—Brandon S Hoffman
(74) *Attorney, Agent, or Firm*—Fenwick & West LLP

(57) ABSTRACT

Computer-implemented methods, apparati, and computer-readable media for thwarting computer attacks. A method embodiment of the present invention comprises the steps of examining (52) a digital certificate (20) presented by a server computer (2); compiling (53) a set of suspicion indications (31) gleaned from said examining step (52); and feeding (54) said suspicion indications (31) to a consequence engine (30).

20 Claims, 4 Drawing Sheets

OTHER PUBLICATIONS

Schneier, Bruce, Managed Security Monitoring: Network Security for the 21st Century, 2001 [online]. Counterpane.com [retrieved Apr. 18, 2003]. Retrieved from the Internet: <URL: http://www.counterpane.com/msm.pdf>, U.S.A.

Web page, announcing Nov. 11, 2000 release of Dshield [online]. Deja.com [retrieved Apr. 18, 2003]. Retrieved from the Internet: >URL: http://groups.google.com/groups?selm=8vm48v%245pd%241%40nnrp1.deja.com&oe=UTF-8&output=gplain>, U.S.A.

e=Security, Inc., Correlation Technology for Security Event Management, Oct. 7, 2002 [online]. eSecurityins.com [retrieved Apr. 18, 2003]. Retrieved from the Internet: <URL: http://www.esecurityinc.com/downloads/Correlation_WP.pdf>, Vienna, VA.

MyNetWatchman.com web pages indicating Sep. 2000 beta release [online]. MyNetWatchman.com [retrieved Apr. 18, 2003]. Retrieved from the Internet: <URL: http://www.mynetwatchman.com/mynetwatchman/relnotes.htm>, Alpharetta, GA.

2000 Review of eSecurity product on Network Security web page [online]. SCMagazine.com [retrieved Apr. 18, 2003]. Retrieved from the Internet: <URL: http://www.scmagazine.com/scmagazine/2000_12/testc/network.htm#Open>.

"Caltarian Security Technology Platform", Riptech web pages [online]. Symantec.com [retrieved Apr. 18, 2003]. Retrieved from the Internet: <URL: http://enterprisesecurity.symantec.com/Content/displayPDF.cfm?SSSPDFID=35&EID=O>, U.S.A.

Slashdot.org web pages describing Dshield, dated Nov. 27, 2000 [online]. Slashdot.org [retrieved Apr. 18, 2003]. Retrieved from the Internet: <URL: http://slashdot.org/article.pl?sid=00/11/27/1957238&mode=thread>, U.S.A.

Chung, C., Gertz, M., and Levitt, K., "DEMIDS: A Misuse Detection System for Database Systems," Department of Computer Science, University of California at Davis, Oct. 1, 1999, pp. 1-18.

SCIP Product, Microdasys—"*The need to control, inspect and manage encrypted webtraffic.*"[online]. Retrieved on Mar. 18, 2005. Retrieved from the Internet: <URL: http://www.microdasys.com/scipproduct+M54a708de802.html>. Author unknown, 2 pages, Czech Republic.

Microdasys, "*S C I P Secured Content Inspection: Protecting the Enterprise from CryptoHacks*," 2003 by Microdasys Inc., 2 pages, Czech Republic.

Marketing, "*Digital Certificates—Best Practices—A Microdasys Whitepaper*," bestpractice.doc, Revision 1.1 (Jul. 31, 2003), 6 pages, Czech Republic.

Network Computing Solutions—"*Microdasys SCIP*" [online]. Retrieved on Mar. 18, 2005. Retrieved from the Internet: <URL: http://www.ncs/cz/index.php?language=en&menuitem-4&subitem=13>, 2 pages, Czech Republic.

Network Computing Solutions—NSC Homepage—*News* [online]. Retrieved on Mar. 18, 2005 . Retrieved from the Internet: <URL: http://www.nsc.cz/index.php?language=en&menuitem=0&subitem=4&subitem=13>, 3 pages, Czech Republic.

"*SSL Stripper Installation Guide*," [online]. Retrieved in Mar. 2005 from the Internet: <URL: http://www.sslstripper.com>, 2 pages, U.S.A.

SSL Stripper Home Page, "*Security Solutions: SSL Stripper*," [online]. Retrieved on Mar. 18, 2005. Retrieved from the Internet: <URL: http://www.vroyer.org/sslstripper/index.html>, 2 pages, Oct. 15, 2004, U.S.A.

SSL Stripper Sample Screenshots, "*Security Solutions: Sample Screenshots*," [online]. Retrieved on Mar. 18, 2005. Retrieved from the Internet: <URL: http://www.vroyer.org/sslstripper/screenshots.html>, 3 pages, Oct. 15, 2004, U.S.A.

Webwasher AG/Full feature set, "*Full feature set*," [online]. Retrieved on Mar. 18, 2005. Retrieved from the Internet: <URL: http://www.webwasher.com/enterprise/products/webwasher_products/ssl_scanner/full_feature_set..html?I...>, 2 pages.

Webwasher AG/Webwasher 1000 CSM Appliance, "*Webwasher 1000 CSM Appliance*," [online]. Retrieved on Mar. 18, 2005. Retrieved from the Internet: <URL: http://www.webwasher.com/enterprise/products/webwasher_products/csm_appliance/index...> 2 pages.

Webwasher AG/Webwasher URL Filter, "*Webwasher URL Filter*," [online]. Retrieved on Mar. 18, 2005. Retrieved from the Internet: <URL: http://www.webwasher.com/enterprise/products/webwasher_products/webwasher_url_filter..> 1 page.

Webwasher AG/Webwasher Anti Virus, "*Webwasher Anti Virus*," [online]. Retrieved on Mar. 18, 2005. Retrieved from the Internet: <URL: http://www.webwasher.com/enterprise/products/webwasher_products/anti_virus/index.html...>, 2 pages.

Webwasher AG/Webwasher Anti Spam, "*Webwasher Anti Spam*," [online]. Retrieved on Mar. 18, 2005. Retrieved from the Internet: <URL: http://www.webwasher.com/enterprise/products/webwasher_products/anti_spam/index.htm...>, 1 page.

Webwasher AG/Webwasher Content Protection, "*Webwasher Content Protection*," [online]. Retrieved on Mar. 18, 2005. Retrieved from the Internet: <URL: http://www.webwasher.com/enterprise/products/webwasher_products/content_ protection/index.html>, 2 pages.

Webwasher AG/Webwasher SSL Scanner, "*Webwasher SSL Scanner*," [online]. Retrieved on Mar. 18, 2005. Retrieved from the Internet: <URL: http://www.webwasher.com/enterprise/products/webwasher_products/ssl_scanner/index.html>, 2 pages.

CyberGuard Corporation, "*CyberGuard and Webwasher: The Value Proposition*," A CyberGuard Corporation White Paper, May 2004, 6 pages.

* cited by examiner

| DOMAIN NAME 1 | IP ADDRESS 1 |
| --- | --- |
| DOMAIN NAME 2 | IP ADDRESS 2 |
| | |
| DOMAIN NAME m | IP ADDRESS m |

DNS 21-23

VALIDATION OF SECURE SOCKETS LAYER COMMUNICATIONS

TECHNICAL FIELD

This invention pertains to the field of preventing malicious attacks to computers when the SSL (Secure Sockets Layer) protocol and related protocols are employed.

BACKGROUND ART

Enterprise firewalls serve many purposes. Traditionally, they have been used to protect computers within an enterprise network from external attacks. Increasingly, one of the purposes of enterprise firewalls is to monitor outgoing traffic from within the enterprise network to external sites. Monitoring outgoing traffic can help protect against exfiltration of data done for nefarious purposes, and can help uncover when an internal computer has been comprised or when an internal user has been tricked into visiting an untrustworthy Website.

The SSL (Secure Sockets Layer) protocol is a popular protocol for allowing a client computer to engage in secure communications with a server computer. For example, using the SSL protocol, a user may divulge his credit card number secure in the knowledge that all communication with the merchant's Website is encrypted. Unfortunately, the SSL protocol provides that outgoing encrypted traffic must pass straight through the enterprise firewall unexamined. This is because the SSL protocol requires end-to-end encryption (from server to browser). This can be very dangerous, as it means that data can be stolen or malicious computer code tunneled through the firewall impervious to examination by security scanning software associated with the firewall.

Enterprises are reluctant to deal with this problem, because there are so many useful Websites that require SSL in order to operate properly, e.g., sites performing credit card transactions. Attempts to provide whitelists of allowable SSL Websites anger internal users and create a high administrative burden for security administrators.

As firewalls are configured more strictly to block traffic on ports known to be used by Remote Access Trojans (RATs) or suspicious traffic in general, attackers will increasingly tunnel return traffic from a compromised computer to the attacker's network using SSL. Tunneling using SSL allows a compromised host computer to communicate through the enterprise firewall, and the strong encryption provided by SSL prevents security software from examining and recognizing the dangerous contents of that traffic.

One proposed solution to this problem is known as "SSL stripping". In this approach, a proxy associated with the firewall is intentionally configured to conduct a man-in-the-middle attack on outgoing SSL traffic. Assuming that the client computers within the enterprise network are configured to trust an enterprise signing key, the proxy uses said enterprise signing key to spoof an arbitrary Website outside the confines of the enterprise network, thus enabling the proxy to decrypt outgoing SSL traffic. SSL stripping has not gained widespread adoption for a number of reasons, including performance, security, and legal requirements related to privacy.

What is needed is a way to solve the aforesaid security problems presented by SSL and related protocols without incurring the problems introduced by SSL stripping. The present invention overcomes these problems admirably.

DISCLOSURE OF INVENTION

Computer-implemented methods, apparati, and computer-readable media for thwarting computer attacks. A method embodiment of the present invention comprises the steps of examining (52) a digital certificate (20) presented by a server computer (2); compiling (53) a set of suspicion indications (31) gleaned from said examining step (52); and feeding (54) said suspicion indications (31) to a consequence engine (30).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

The present invention will be primarily illustrated in conjunction with the SSL (Secure Sockets Layer) protocol, although it has applicability to any security protocol in which an unencrypted digital certificate is used to proclaim the authenticity of an entity that issued the digital certificate.

Figure 1:
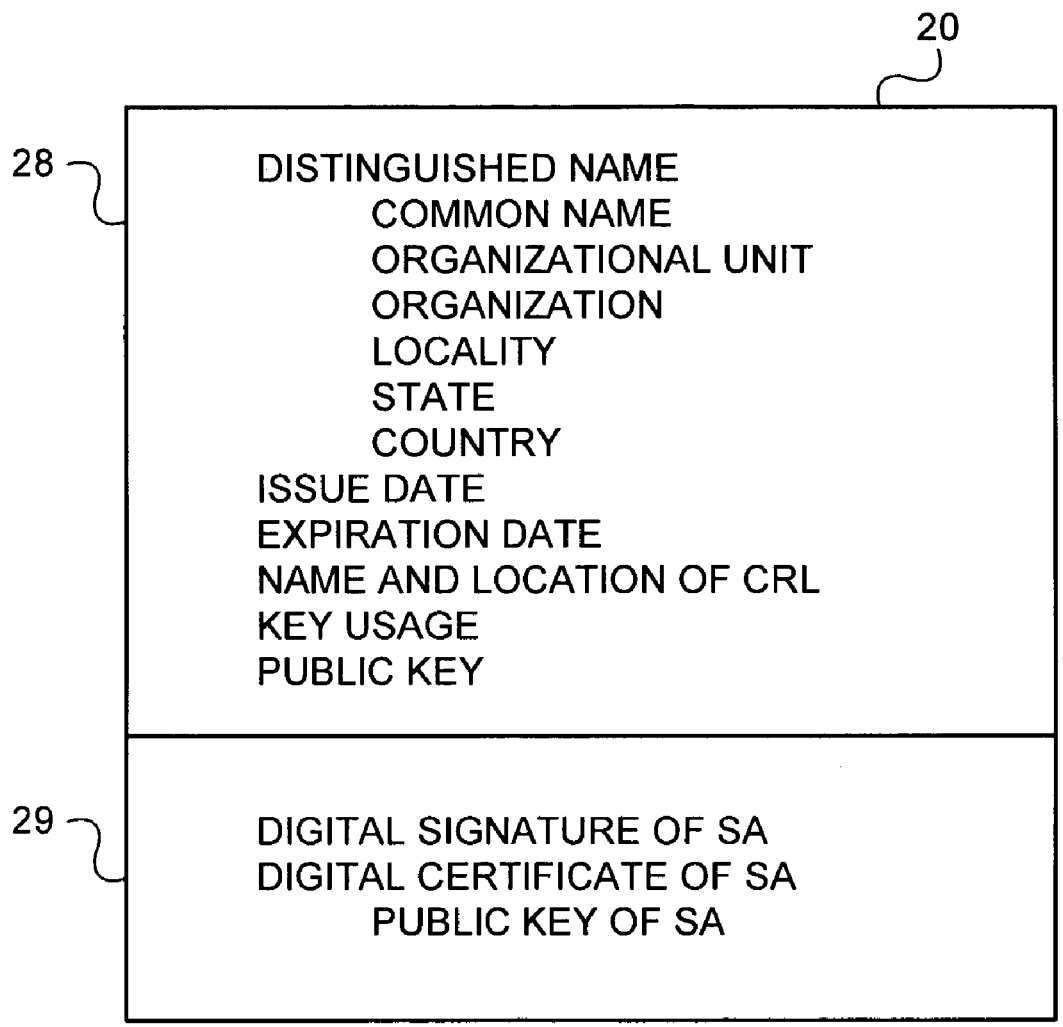
FIG. 1 is an illustration of a typical digital signature 20.

A typical digital certificate 20 is illustrated in FIG. 1. There are a number of protocols and standards, including the X.509 standard and the PKCS 7 standard, that specify mandatory and optional fields that should be used in digital certificates. The digital certificate 20 illustrated in FIG. 1 contains the following fields:

Distinguished Name. The distinguished name is the concatenation of several fields, including Common Name, one or more Organizational Units, Organization, Locality, State, and Country.

Common Name. The Common Name is usually the domain name, e.g., amazon.com, of the computer 2 that presented the certificate 20. However, the Common Name can also be the IP (Internet Protocol) address, e.g., 12.23.45.61, of the computer 2 that presented the certificate 20.

Issue Date. This is the date that the digital certificate 20 was issued by the Signing Authority (SA).

Expiration Date. This is the date on which the digital certificate 20 will expire. After the expiration date, the digital certificate 20 should not be further used or accepted.

Name and Location of Certificate Revocation List (CRL). This is the name and location associated with a list that publishes IDs of digital certificates 20 that have been revoked. This field is sometimes referred to as a "CRL distribution point". An example is URL=http://crl.versign.com/RSASecureServer.crl.

Key Usage. These fields indicate certain attributes of the digital certificate 20. One such field indicates whether the certificate 20 can legally be used as a server in the SSL authentication process.

Public Key. This is the public key of the computer 2 that presented the digital certificate 20. The public key is paired with a private key so that techniques of public key cryptography (as that term is normally defined) can be employed.

The fields described above are referred to collectively as the "certificate proper" 28.

Digital Signature of Signing Authority (SA). The signing authority is the entity that vouchsafes the authenticity of the digital certificate 20. The SA's digital signature is formed by the signing authority using a hash function to create a message digest of the certificate proper 28, then encrypting said message digest using its private key.

Digital Certificate of Signing Authority. This digital certificate is used by third parties to verify the legitimacy of the signing authority, and typically contains the same or similar fields as certificate proper 28, e.g., the public key of the SA.

The two fields described immediately above are referred to as the "signing block" 29.

Figure 2:
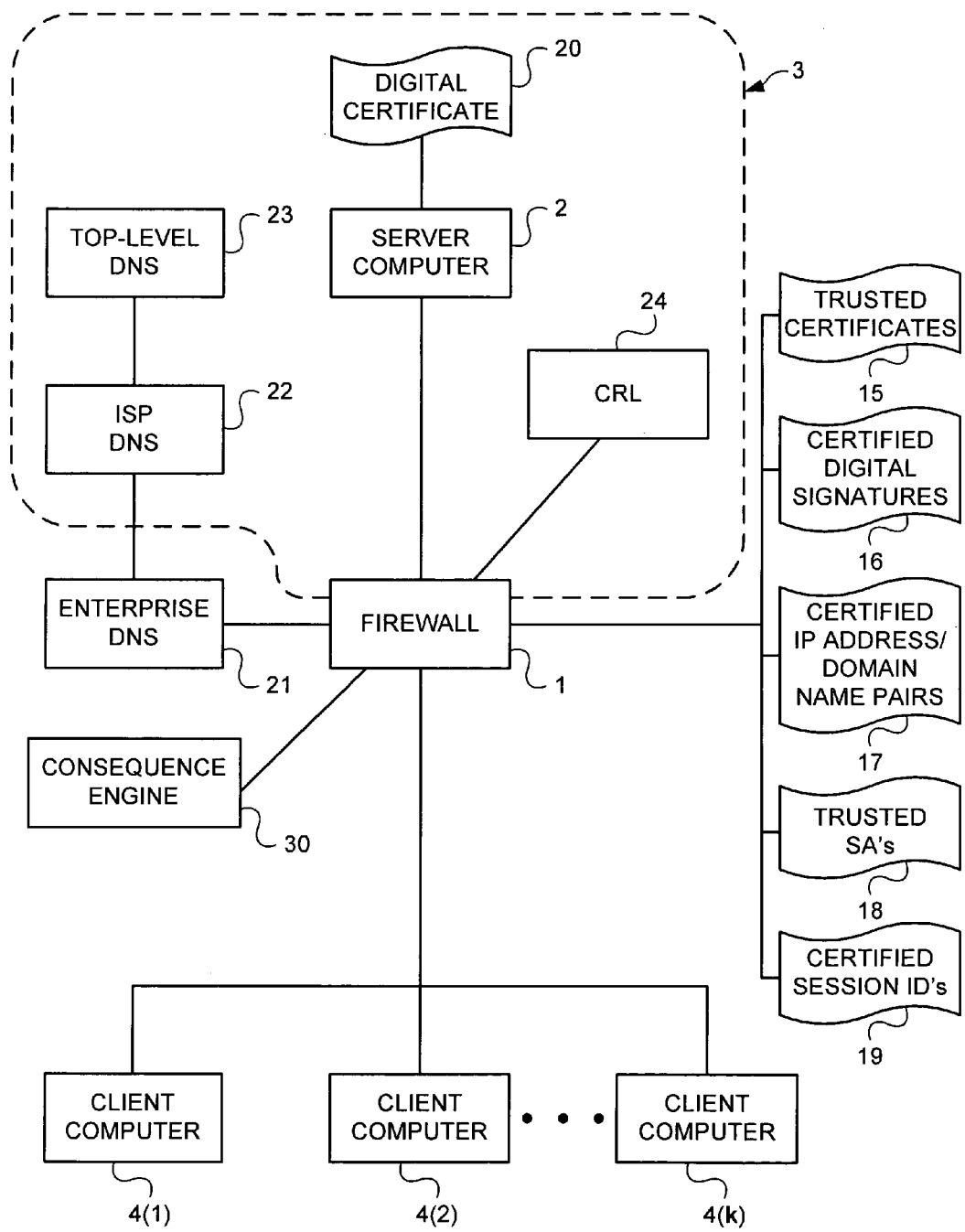
FIG. 2 is a block diagram illustrating apparatus suitable for carrying out the present invention.

FIG. 2 illustrates apparatus suitable for carrying out the present invention. Firewall 1 is situated at the boundary of the overall network 3, which may be the Internet, and computers and/or modules located within the confines of the enterprise network. Said computers and/or modules are coupled to firewall 1 and are: a plurality of client computers 4, an enterprise Domain Name Server (DNS) 21, a consequence engine 30, a cache 19 of session IDs, a whitelist 18 of trusted signing authorities, a cache 17 of domain names, a cache 16 of digital signatures, and a whitelist 15 of approved certificates.

Network 3 can be any wired or wireless network, but for purposes of illustration it will often be referred to herein as the Internet.

Within network 3 are a plurality of server computers 2 (one server computer 2 is illustrated in FIG. 2, a computer 2 that presents a digital certificate 20), CRL 24, an ISP (Internet Service Provider) DNS 22 coupled to enterprise DNS 21, and a top level DNS 23 coupled to INS DNS 22. Top level DNS 23 is the DNS controlled by the custodian of the corresponding top level domain. For example, if the top level domain is org, the custodian is VeriSign.

Whitelists 15 and 28, caches 16, 17, and 19, and enterprise DNS 21 are optional. Whitelists 15 and 18, and caches 16, 17, and 19, can reside in the form of either disk or memory caches coupled to firewall 1.

Modules 1, 15-19, 21, and 30 can be implemented in any combination of hardware, firmware, and/or software. When implemented in software, these modules can reside on one or more computer-readable media, such as one or more hard disks, floppy disks, CDs, DVDs, etc.

Figures 3, 4:
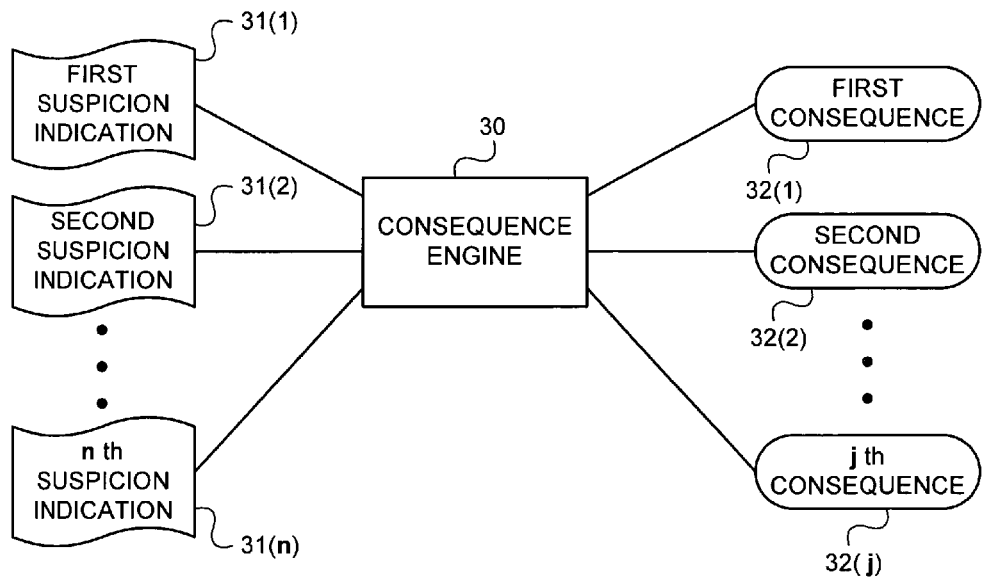
FIG. 3 is a block diagram illustrating consequence engine 30 of the present invention.
FIG. 4 is an illustration of a domain name server 40.

FIG. 3 illustrates that consequence engine 30 can be a state machine having a plurality of inputs corresponding to suspicion indications 31 and a plurality of outputs corresponding to consequences 32. Suspicion indications 31 are generated by firewall 1 upon investigation of digital certificates 20 presented by server computer 2. There are many factors that could possibly give rise to a suspicion that digital certificate 20 is part of a computer attack. Said suspicion indications include, but are not limited to, the following:

A self-signed digital certificate 20. A self-signed digital certificate 20 gives rise to suspicion of nefarious intent, because very few attackers are willing to incur the accountability that follows from applying for a digital certificate 20 from a legitimate signing authority (such as VeriSign). An increasing number of self-signed digital certificates 20 are being observed of late. Attackers who use Trojan horses tend to use self-signed digital certificates 20. A self-signed digital certificate 20 can be detected by comparing the public key as given in the certificate proper 28 with the public key of the signing authority as given in the signature block 29.

A digital certificate 20 that was not issued by a trusted signing authority. Firewall 1 can test the trustworthiness of the signing authority by examining the digital certificate of the signing authority as given in the signature block 29, using conventional techniques of public key cryptography. This may entail going through a chain of digital certificates until a root certificate is encountered. A root certificate is a digital certificate that is self-signed by a signing authority that firewall 1 trusts. The process of verifying trustworthiness can be facilitated by using a whitelist 15 of trusted certificates and a whitelist 18 of trusted signing authorities.

A digital certificate 20 that has been revoked. Revocation of the digital certificate 20 can be easily checked by firewall 1 examining the certificate revocation list 24 that is given in the certificate proper 28.

A digital certificate 20 that has expired. The expiration of the digital certificate 20 can be easily checked by firewall 1 examining the expiration date field within the certificate proper 28, and comparing this date with the date produced by firewall 1's internal clock.

A digital certificate 20 having a common name comprising an IP address. This condition can be easily determined by firewall 1 checking the common name field of the certificate proper 28. Most legitimate organizations utilize a URL for their common name, rather than an IP address. Therefore, an IP address as the common name is inherently suspicious.

A digital certificate 20 that has been tampered with. This tampering can be detected by firewall 1 using techniques of public key cryptography. Specifically, in order to validate that digital certificate 20 has not been tampered with, firewall 1 decrypts the digital signature of the signing authority using the public key of the signing authority, to get a first message digest. Then firewall 1 compares the first message digest with a second message digest that it calculates by applying to the certificate proper 28 the same hash function that the signing authority used to calculate its version of the message digest. For the SSL protocol, the hash function is usually MD-5. If the first and second message digests are the same, firewall 1 concludes that digital certificate 20 has not been tampered with. In order to speed this verification process, a cache 16 of previously verified digital signatures can be maintained. Firewall 1 first checks cache 16. If the digital signature appears in cache 16, firewall 16 does not have to perform the entire verification process.

A digital certificate 20 having a common name comprising a domain name that does not match an IP address of the server computer 2 that presented the digital certificate 20. This condition can be checked by means of firewall 1 performing a reverse DNS lookup on said IP address. The layout of a typical Domain Name Server (DNS) 21-23 is shown in FIG. 4. DNS 21-23 is indexed by domain name. For each domain name that is fed to DNS 21-23 as an input, DNS 21-23 produces a corresponding IP address. Reverse DNS lookup means that firewall 1 feeds as the input to DNS 21-23 an IP address. The DNS database then produces a corresponding domain name. In this case, firewall 1 feeds DNS 21-23 with the IP address of the server computer 2 that presented the digital certificate 20. The result of the reverse DNS lookup is a domain name. That domain name is compared with the domain name within the common name field of the certificate proper 28. If the two domain names are not identical, firewall 1 has reason to suspect nefarious intent.

To perform the reverse DNS lookup, firewall 1 first consults enterprise DNS 21 contained in a storage means coupled to firewall 1. If the given IP address is not located within enterprise DNS 21, firewall 1 next consults the next higher level DNS, which is the DNS 22 of the Internet Service Provider (ISP). If the IP address is not in ISP DNS 22, firewall 1 checks top level DNS 23.

The various suspicion indications 31 are given corresponding pre-selected weights, as contained within consequence engine 30, which uses a pre-selected algorithm to output one or more consequences 32. The weights and the algorithm can be changed over time, by changing settings within engine 30.

The algorithm causes the indications 31 to be combined in any arbitrary pre-selected fashion. There are many possible consequences 32, including, but not limited to:

Holding in abeyance for perusal by a system administrator communications vouchsafed by said digital certificate 20.

Allowing communications vouchsafed by said digital certificate 20 to proceed, but alerting a system administrator.

Blocking communications vouchsafed by said digital certificate 20.

Monitoring frequency and/or other characteristics of communications vouchsafed by said digital certificate 20.

Figure 5:
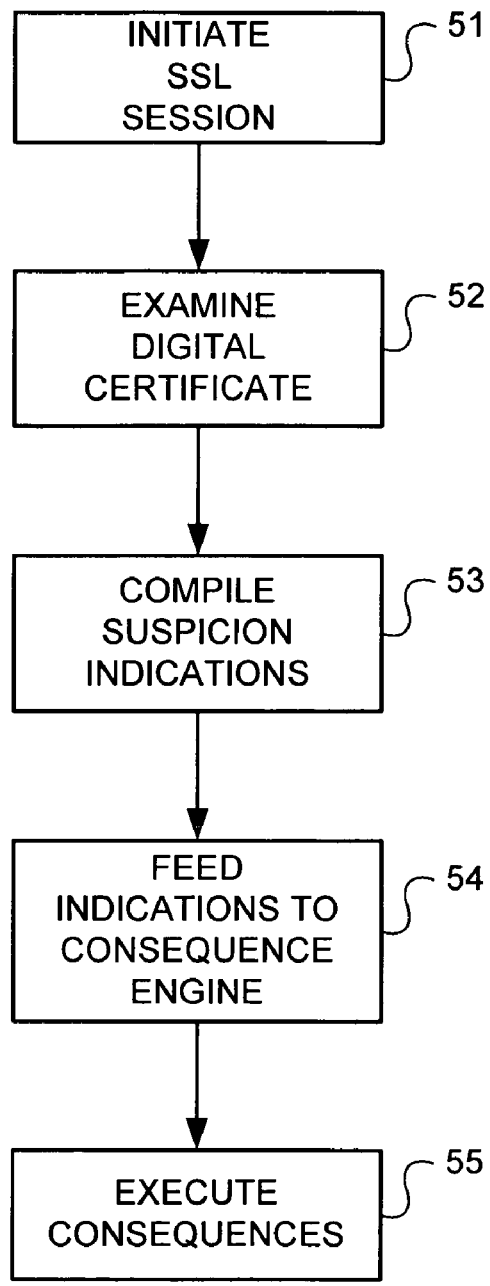
FIG. 5 is a flow diagram illustrating a method embodiment of the present invention.

A method embodiment of the present invention is illustrated in FIG. 5. At step 51, the SSL session (or other session employing digital certificates 20) is initiated. In the case of SSL, this is done by client computer 4 requesting that a SSL session be opened.

At step 52, firewall 1 examines the digital certificate 20 presented by the server computer 2.

At step 53, firewall 1 compiles the set of suspicion indications 31, as described above.

At step 54, firewall 1 feeds the suspicion indications 31 as inputs to consequence engine 30, which outputs one or more consequences 32.

Finally, at step 55, the consequences 32 are implemented by modules associated with firewall 1, using conventional techniques known to those of ordinary skill in the art. Said modules are not illustrated, as they are beyond the scope of this invention.

It can be seen from the above description that the present invention does not decrypt any substantive communications, thereby avoiding the afore-described problems of SSL stripping. It should also be noted that in normal use, the SSL server 2 performs a handshaking only once per SSL session. Even if hundreds of TCP (Transport Control Protocol) connections are made requesting SSL pages, the same session key (a symmetric key) is used, thus minimizing performance impact. As a result, any performance impact occasioned by using the SSL validation techniques of the present invention is likewise minimized.

An attack against, and a circumvention of, the techniques of the present invention, along with countermeasures, will now be described.

Attack. An attacker might attempt to hardcode (e.g., by using a Trojan horse) an SSL session identifier (ID) in the client computer 4 and in the server computer 2. A session identifier is the name of the symmetric session key that uniquely identifies the session. By hardcoding the session ID, the attacker intends that the SSL handshaking be bypassed.

The countermeasure to this attack is for firewall 1 to periodically check the current session ID against a cache 19 of previously validated session IDs. When the current session ID is not in said cache 19, firewall 1 forces an SSL handshake. This is legal under the SSL protocol, which permits handshaking at any point. An SSL handshake includes the step of server computer 2 presenting a digital certificate 20. The afore-described techniques of the present invention are then used to validate said digital certificate 20.

Circumvention. If the techniques of the present invention gain widespread adoption, attackers could attempt to hardcode (e.g., by using a Trojan horse) a public key in client computer 4. If a Trojan client 4 and a server 2 use a customized SSL library that uses a hardcoded public key, the server 2 can present any legitimate certificate 20 (such as one from eBay, citibank, or amazon.com) and the present invention will believe that it is a valid certificate 20. The client 4 ignores the certificate 20 and encrypts the session key using the agreed upon (hardcoded) public key—not the one in the certificate which only eBay, etc. would be able to decrypt. The server 2 decrypts the session key using the private key that corresponds to the agreed upon (hardcoded) public key. The present invention cannot tell that the encrypted transmission was encrypted using a different key than the one in the certificate 20, because it's encrypted.

The countermeasure to this circumvention is for firewall 1 to perform a reverse DNS lookup (as previously described) on the IP address of a communication that emanates from client computer 4 and exits firewall 1. The reverse DNS lookup will yield the actual domain name of the server computer 2 associated with said IP address. Firewall 1 then compares that actual domain name with the domain name in the common name field of the digital certificate 20 issued by said server computer 2. If the two domain names are not identical, firewall 1 reaches a conclusion of suspicion of nefarious activity. To speed up this process, rather than comparing the actual domain name against the domain name contained in the common name field of the digital certificate 20, firewall 1 can compare said actual IP address/domain name pair against a cache 17 of previously validated IP address/domain name pairs. If the pair is not in cache 17, firewall 1 adds the pair to cache 17 upon verifying that the pair is valid.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer implemented method for thwarting computer attacks, said method comprising the steps of:
    examining a digital certificate presented by a server computer, wherein the digital certificate was presented by the server computer in response to an SSL session initiated by a client computer;
    compiling a set of suspicion indications gleaned from said examining step;
    feeding said suspicion indications to a consequence engine to output a consequence of the digital certificate, the consequence engine giving weights to the suspicion indications in the set and combining the weights to determine the consequence; and
    performing the outputted consequence, wherein the consequence comprises a consequence from the group consisting of:
        allowing communications vouchsafed by said digital certificate to proceed;
        holding in abeyance for perusal by a system administrator communications vouchsafed by said digital certificate; and
        blocking communications vouchsafed by said digital certificate.

2. The method of claim 1 wherein the consequence engine is a state machine having a plurality of inputs corresponding to suspicion indications and a plurality of outputs corresponding to consequences.

3. The method of claim 2 wherein at least one suspicion indication is an indication from the group of indications consisting of:
    a self-signed digital certificate;
    a digital certificate that was not issued by a trusted signing authority;

a digital certificate having a common name comprising an IP address;

a digital certificate having a common name comprising a domain name that does not match an IP address of the server computer that presented the digital certificate.

4. The method of claim 3 wherein a reverse DNS lookup is used to detect a digital certificate having a common name comprising a domain name that does not match an IP address of the server computer that presented the digital certificate.

5. The computer-implemented method of claim 1 further comprising the steps of:
checking a current session ID against a cache of valid session IDs; and
when the current session ID is not in said cache, forcing an SSL handshake to cause the server to present the digital certificate.

6. A computer-implemented method for thwarting computer attacks, said method comprising the steps of:
performing a reverse DNS lookup on an IP address of a communication exiting a firewall, in order to obtain an actual domain name of a server computer associated with said IP address; and
comparing said actual domain name against a domain name contained in a digital certificate presented by said server computer, wherein the digital certificate was presented by the server computer in response to an SSL session initiated by a client computer.

7. A computer-implemented method for thwarting computer attacks, said method comprising the steps of:
performing a reverse DNS lookup on an IP address of a communication exiting a firewall, in order to obtain an actual domain name of a server computer associated with said IP address;
comparing said IP address/domain name pair against a cache of previously certified IP address/domain name pairs;
responsive to the comparison indicating that the IP address/domain name pair is not in the cache, comparing the actual domain name against a domain name contained in a digital certificate presented by said server computer, wherein the digital certificate was presented by the server computer in response to an SSL session initiated by a client computer;
responsive to the actual domain name matching the domain name contained in the digital certificate, adding the IP address/domain name pair to the cache; and
responsive to the actual domain name not matching the domain name contained in the digital certificate, determining a suspicion that a computer attack is occurring.

8. At least one computer-readable medium containing computer program instructions for thwarting computer attacks, said computer program instructions performing the steps of:
examining a digital certificate presented by a server computer, wherein the digital certificate was presented by the server computer in response to an SSL session initiated by a client computer;
compiling a set of suspicion indications gleaned from said examining step;
feeding said suspicion indications to a consequence engine to output a consequence of the digital certificate, the consequence engine giving weights to the suspicion indications in the set and combining the weights to determine the consequence; and
performing the outputted consequence, wherein the consequence comprises a consequence from the group consisting of:

allowing communications vouchsafed by said digital certificate to proceed;
holding in abeyance for perusal by a system administrator communications vouchsafed by said digital certificate; and
blocking communications vouchsafed by said digital certificate.

9. The at least one computer-readable medium of claim 8 wherein the consequence engine is a state machine having a plurality of inputs corresponding to suspicion indications and a plurality of outputs corresponding to consequences.

10. The at least one computer-readable medium of claim 9 wherein at least one suspicion indication is an indication from the group of indications consisting of:
a self-signed digital certificate;
a digital certificate that was not issued by a trusted signing authority;
a digital certificate having a common name comprising an IP address;
a digital certificate having a common name comprising a domain name that does not match an IP address of the server computer that presented the digital certificate.

11. The at least one computer-readable medium of claim 10 wherein a reverse DNS lookup is used to detect a digital certificate having a common name comprising a domain name that does not match an IP address of the server computer that presented the digital certificate.

12. The at least one computer-readable medium of claim 8, said computer program instructions further performing the steps of:
checking a current session ID against a cache of valid session IDs; and
when the current session ID is not in said cache, forcing an SSL handshake to cause the server to present the digital certificate.

13. At least one computer-readable medium containing computer program instructions for thwarting computer attacks, said computer program instructions performing the steps of:
performing a reverse DNS lookup on an IP address of a communication exiting a firewall, in order to obtain an actual domain name of a server computer associated with said IP address; and
comparing said actual domain name against a domain name contained in a digital certificate presented by said server computer wherein the digital certificate was presented by the server computer in response to an SSL session initiated by a client computer.

14. At least one computer-readable medium containing computer program instructions for thwarting computer attacks, said computer program instructions performing the steps of:
performing a reverse DNS lookup on an IP address of a communication exiting a firewall, in order to obtain an actual domain name of a server computer associated with said IP address; and
comparing said IP address/domain name pair against a cache of previously certified IP address/domain name pairs;
responsive to the comparison indicating that the IP address/domain name pair is not in the cache, comparing the actual domain name against a domain name contained in a digital certificate presented by said server computer, wherein the digital certificate was presented by the server computer in response to an SSL session initiated by a client computer;

responsive to the actual domain name matching the domain name contained in the digital certificate, adding the IP address/domain name pair to the cache; and responsive to the actual domain name not matching the domain name contained in the digital certificate, determining a suspicion that a computer attack is occurring.

15. Apparatus for thwarting computer attacks, said apparatus comprising:

a firewall situated on a boundary between an enterprise network and an overall network;

a client computer situated within the enterprise network and coupled to the firewall; and a consequence engine coupled to the firewall, situated within the enterprise network, and adapted to convert a set of suspicion indications gleaned from said firewall critically examining a digital certificate presented by a server computer in response to an SSL session initiated by the client computer, the presented by a server computer situated within the overall network, into at least one consequence and to output a consequence of the digital certificate, the consequence engine giving weights to the suspicion indications in the set and combining the weights to determine the consequence;

wherein the firewall performs the outputted consequence, and the consequence comprises a consequence from the group consisting of:

allowing communications vouchsafed by said digital certificate to proceed;

holding in abeyance for perusal by a system administrator communications vouchsafed by said digital certificate; and blocking communications vouchsafed by said digital certificate.

16. The apparatus of claim 15 further comprising, coupled to said firewall, a cache of pre-approved session IDs.

17. The apparatus of claim 15 further comprising, coupled to said firewall, a whitelist of trusted signing authorities whose digital signatures on said digital certificate are trusted by said client computer.

18. The apparatus of claim 15 further comprising, coupled to said firewall, a cache of pre-verified IP address/domain name pairs.

19. The apparatus of claim 15 further comprising, coupled to said firewall, a cache of pre-verified digital signatures.

20. The apparatus of claim 15 further comprising, coupled to said firewall, a whitelist of trusted digital certificates.

* * * * *

UNITED STATES PATENT AND TRADEMARK OFFICE
CERTIFICATE OF CORRECTION

PATENT NO. : 7,634,811 B1
APPLICATION NO. : 11/134696
DATED : December 15, 2009
INVENTOR(S) : Darrell Kienzle et al.

Page 1 of 1

It is certified that error appears in the above-identified patent and that said Letters Patent is hereby corrected as shown below:

Column 9, line 18, after "computer, the" delete "presented by a".

Signed and Sealed this

Ninth Day of February, 2010

David J. Kappos
*Director of the United States Patent and Trademark Office*